United States Patent [19]

Spensberger et al.

[11] Patent Number: 4,717,293
[45] Date of Patent: Jan. 5, 1988

[54] METHOD FOR CHAMFERING THE AXIALLY FACING ENDS OF TOOTHED WORKPIECES, A MESHING ENGAGEMENT AID MANUFACTURED ACCORDING TO THIS METHOD, AND AN APPARATUS FOR PERFORMING THE METHOD

[75] Inventors: Johann Spensberger, Poing; Heinrich Fischer; Richard Mueller, both of Munich, all of Fed. Rep. of Germany

[73] Assignee: Carl Hurth Maschinen- und Zahnradfabrik GmbH & Co., Munich, Fed. Rep. of Germany

[21] Appl. No.: 777,666

[22] Filed: Sep. 18, 1985

[30] Foreign Application Priority Data

Sep. 20, 1984 [DE] Fed. Rep. of Germany ....... 3434558

[51] Int. Cl.⁴ .............................................. B23F 19/10
[52] U.S. Cl. .......................................... 409/9; 74/460; 409/58
[58] Field of Search ............ 409/8, 9, 27, 42, 43, 409/44, 45, 46, 49, 58, 293, 303, 348; 82/19, 24 AD; 51/52 R, 287; 74/460

[56] References Cited

U.S. PATENT DOCUMENTS 2,865,257 12/1958 Christman et al. .................... 409/9

FOREIGN PATENT DOCUMENTS 1047578 12/1958 Fed. Rep. of Germany .

OTHER PUBLICATIONS

Werkstatt and Betrieb, 95th Year, (1962), Issue 3, pp. 139 to 143.

Primary Examiner—Z. R. Bilinsky
Attorney, Agent, or Firm—Flynn, Thiel, Boutell & Tanis

[57] ABSTRACT

A method and an apparatus for the chamfering of the axially facing ends of toothed cylindrical or conical workpieces in which a cutting tool arranged on a rocking lever is moved back and forth in response to the peripheral speed of the workpiece which constantly rotates about its axis. The cutting edge of the tool acts chip-removingly during each stroke that is directed onto or toward the axially facing surface of each tooth of the workpiece. The cutting edge moves along a circular segment path, the axis of which extends at least approximately parallel to a radial of the workpiece, which radial starts out from the workpiece axis and extends through the tooth which is to be worked or machined.

26 Claims, 16 Drawing Figures

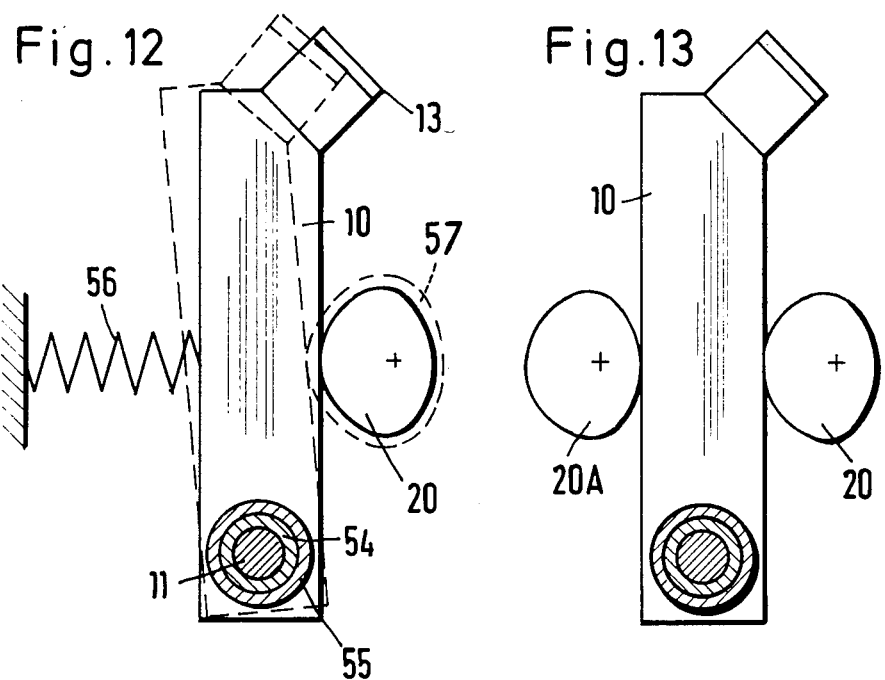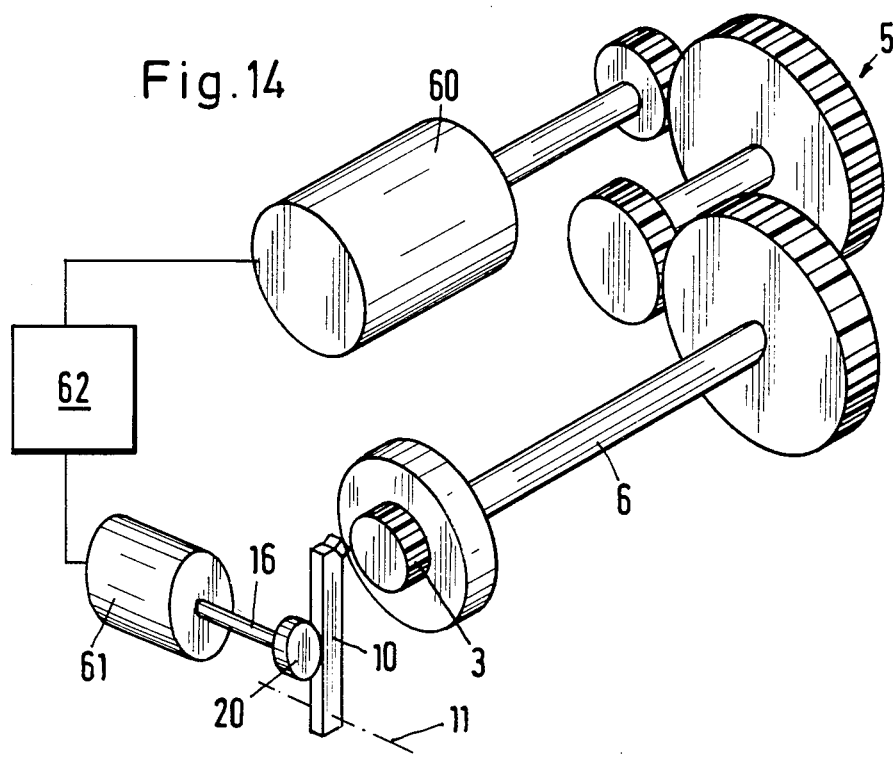

METHOD FOR CHAMFERING THE AXIALLY FACING ENDS OF TOOTHED WORKPIECES, A MESHING ENGAGEMENT AID MANUFACTURED ACCORDING TO THIS METHOD, AND AN APPARATUS FOR PERFORMING THE METHOD

FIELD OF THE INVENTION

The invention relates to a method for chamfering the axially facing ends of toothed cylindrical or conical workpieces, a meshing engagement aid manufactured according to this method, and an apparatus for performing the method.

BACKGROUND OF THE INVENTION

Chamfers on gears for easing the axial meshing engagement of synchronous tooth systems, sliding gears and similar transmission parts are manufactured today mostly by a milling operation utilizing an indexing method and a pushlike feed ("push milling") on tooth-edge milling machines especially designated for this type of work. (Werkstatt und Betrieb, 95th year (1962), Issue 3, Pages 139 to 143). For adjusting the tool to the correct position relative to the workpiece, five auxiliary or adjustable axes are needed. Therefore, for a two-spindle push milling machine, aside from the three operating axes (one for the workpiece and two for the two tools) no less than 10 auxiliary axes are needed. Little attention was paid to this situation in the past, where the auxiliary axes were adjusted manually with simple means. However, this situation becomes of considerable importance for the future, particularly when the auxiliary axes for achieving a high degree of flexibility in the manufacturing devices are used and simultaneously therewith a short change-over time is needed and must be adjusted automatically. These considerations must be preprogrammed. It can easily be recognized that such machines can be changed over only with a considerable amount of structural and technical input to facilitate use in a flexible manufacturing situation.

Chamfers produced by shaping with a shaper tool are manufactured comparatively rarely (German AS No. 1 047 578), however, this method up to now has not been successful. Since for changing over less auxiliary axes are necessary, the possibility for a use in a flexible manufacturing situation results. However, it is disadvantageous that the V-shape of the chamfer which is to be produced can vary only within very narrow limits.

therefore, the basic purpose of the invention is to provide a method for the "shaping" of chamfers and an apparatus which is suited therefor, and which facilitates the manufacture of various chamfer shapes, namely both on externally and also on internally toothed parts.

The method is not only suited to produce flat chamfered surfaces. It is also possible through modifications to a cam plate which controls the stroke movement to produce spherically convexed or concaved chamfer surfaces. The most often encountered form of the chamfer is the so-called "straight chamfer surface", however. The straight chamfer surface is characterized by a pair of angled, flat surfaces angled at about 90° and by flat to slightly spherical chamfer surfaces. That this chamfer shape is capable of improvement results from the geometric relationships. A V-shaped chamfer can be viewed as an optimum, the chamber halves of which correspond to the cutaway portion from a multiple-thread screw having a spiral angle corresponding with the angle of the V-shape. Because of the coaxial arrangement of the parts which are to be moved into engagement with one another during a simultaneous rotation relative to one another, the spiral construction of the meshing engagement aid offers a satisfactory sliding of the two parts relative to one another and into engagement with one another without shifting the contact point or the contact line.

Such a meshing engagement aid in the form of a cutaway portion from a screw can be manufactured with the inventive method. It is preferable that the machining grooves extend in the direction of the indexing movement and not, as this is the case in milling, transversely thereto. The meshing engagement aid is provided preferably with a roundness at a ridge between chamfer halves, which is possible with the inventive method without any additional operational sequences. The roundness prevents a splintering or flaking off of the ridge during a striking by or on the countertooth.

To adjust this rocking lever so that the cutting edge of the tool hits centrally or at a desired distance eccentrically onto the workpiece tooth, the apparatus can be further developed by supporting the rocking lever on an adjustable eccentric. For effecting a cooperation of a cam plate and the rocking lever, a spring can be used to urge the rocking lever into engagement with the cam plate or the rocking lever can be guided between a pair of cam plates. The size of the movement of the rocking lever and thus the length of the tool stroke can be varied very simply by providing a conical surface on the cam plate and supporting the cam plate for axial movement. When the apparatus is to be used for deburring or chamfering, a further development, namely, adjustably supporting the axis of the rocking lever for movement in a plane defined by the workpiece axis and a radial of the workpiece, can be preferable in order to be able to also work the base of the tooth on a workpiece.

The cooperation of the workpiece spindle with the control shaft or the workpiece with the tool can occur both mechanically and also electrically. In the latter case, it is possible to produce a modification to the chamfer surface characteristic.

BRIEF DESCRIPTION OF THE DRAWINGS

The invention will be described hereinafter with reference to several exemplary embodiments illustrated in 16 figures, in which:

FIGS. 12 and 13 illustrate two variations of the operative cooperation between a rocking lever and a cam plate;

FIG. 14 is a schematic illustration of the drive connection by means of an electric shaft;

DETAILED DESCRIPTION

Figure 1:
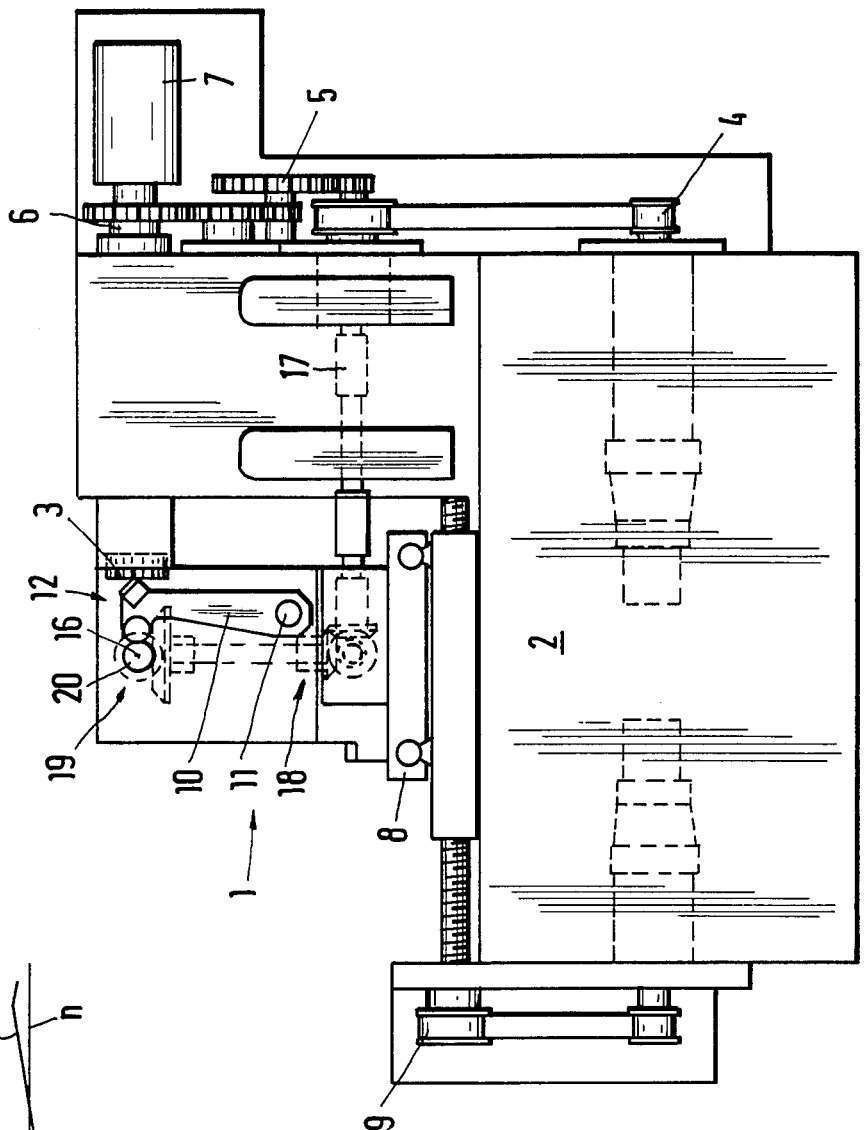
FIG. 1 illustrates a machine to which the invention can be applied.

A workpiece (gear) 3, which is to be worked or machined is rotatably supported or chucked by conventional means 7 provided on the column 2 of a machine tool 1. A rotary drive of the workpiece occurs from the main drive 4 through a contershaft and gear arrangement 5 and exchangeable gears provided on a workpiece spindle 6. A cross slide 8 is movably arranged on the column 2. The requisite drive means for the slide 8 are identified by the reference numeral 9. A rocking lever 10 is pivotally supported for movement about an axle 11 on the cross slide 8. The rocking lever 10 carries at its free end a cutting tool 12 in the form of a slotting tool, a turning cutting plate or the like. The cutting edge 13 of the tool 12 extends parallel with respect to the axially facing front face of the workpiece 3 and with respect to a radial 14, which extends from the workpiece axis centrally through the tooth 15 which is to be worked or machined. A rotatably supported control shaft 16 is furthermore rotatably driven on the cross slide 8. The control shaft 16, starting out from a main drive 4, is driven through a drive shaft 17, which can be pulled out or extended, and two bevel-gear sets 18, 19, the last of which carries a cam plate 20 thereon. The cam plate 20 presses against the rocking lever 10 and causes the tool 12 to carry out a stroke toward and away from the tooth 15 which is to be worked or machined, namely, along a circular-segment-shaped path, so that a chip removal occurs during the forward stroke or movement of the cutting edge 13 toward the central plane of the workpiece. The workpiece 3 rotates continuously. The rotary movement of the workpiece and the stroke movement of the tool 12 are adjusted to one another such that the tool 12, during one workpiece rotation, performs just as many strokes as the workpiece has teeth. In this manner all teeth are worked or machined during one rotation.

Figure 2:
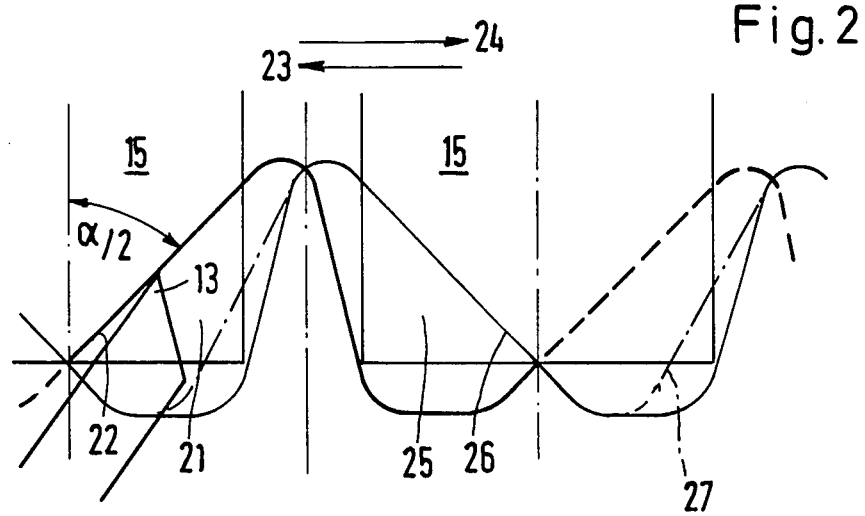
FIG. 2 is a cutaway portion of a development of the tool teeth and the movement of the tool.
Figure 3:
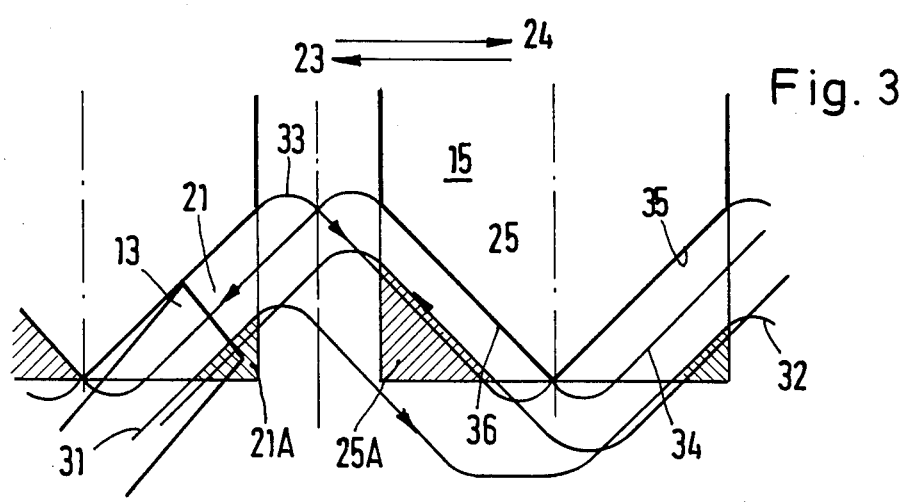
FIG. 3 is the same development with a different movement of the tool.

The cam plate 20 has such a shape to cause the cutting edge 13 to engage, during the forward stroke, an axially facing surface portion of a tooth 15, particularly the circumferential midpart or center of the tooth 15 which is to be worked or machined (FIG. 2). The workpiece rotates thereby in the direction of the arrow 23 in FIG. 2. Continued movement of the cutting edge 13 and with a simultaneously occurring rotation of the workpiece, one axial end edge 21 of a tooth on the workpiece is removed and along a slope or bevel having an angle $\alpha/2$ (FIG. 2). As soon as the edge 21 exits from the tooth 15, the return stroke of the tool occurs, namely in such a manner that the cutting edge 13 passes by the next adjacent tooth 15A without striking same. The cutting edge 13 then strikes the tooth 15A just as it did on the tooth 15, namely, at the circumferential midpart of an axially facing surface or the next adjacent tooth, during the next forward stroke. The curve of the path of the tool, which corresponds with one rotation of the cam plate 20, is illustrated by a thick line in FIG. 2 and is identified by the reference numeral 22. After all teeth have been worked or machined, the direction of rotation of the workpiece is reversed (arrow direction 24) and the same or another tool removes the other tooth edges 25 in the same manner (following a curved path 26). Since the tooth edges 21 are already removed, the tool retracting part of the curve 26 is able to extend into this area as illustrated by the path segment 27. The edges 21, 25 can also be removed during several cutting steps. One example for this is illustrated in FIG. 3. the cutting edge 13 first moved along the curve 31. The workpiece rotates thereby in the direction of the arrow 23. During this operation, the edges 21 are partially removed (shaded areas 21A). The direction of rotation is then changed (arrow direction 24) so that the cutting edge 13 moves along the curve 32; the edges 25 are thereby partially removed (shaded surface 25A). The direction of rotation is subsequently changed again, and the cutting edge now moves along the curve 33 to finish the sloped or chamfered surface 35. Finally the direction of rotation is changed again, namely, to the direction of the arrow 24, and the edge which now follows the curve 34 finishes the sloped or chamfered surface 36. The direction of the arrows, which are illustrated in the curves 31 to 34, indicate the directions of relative movement occurring between the cutting edge 13 and the workpiece 3. The cutting edge 13 in FIG. 3 is illustrated slightly differently from the illustration of FIG. 2. This cutting edge configuration will cause, in both directions of rotation, the same cutting conditions. The "partial working" feature permits the working or machining of greater edge angles ($\alpha/2$), for which insufficient clearance space exists between the tool and the next adjacent tooth on the workpiece during a complete or one step working according to FIG. 2.

Figures 4, 5:
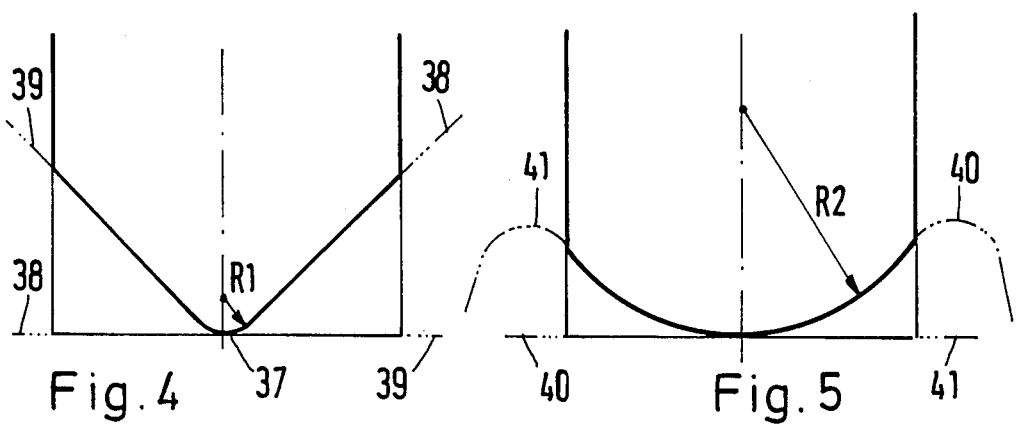
FIG. 4 illustrates a chamfered workpiece tooth having a rounded ridge between the chamfer surfaces.
FIG. 5 illustrates a rounded chamfer surface.

In the examples according to FIGS. 2 and 3, the cutting edge 13 is moved away from the axially facing portion of the tooth system on the workpiece during the return stroke. However, it is also possible for the cutting edge to be retracted only up to the front or axially facing surface of the workpiece 3. The chamfered edge on the teeth 15 can then take on a rounded contour 37 (FIG. 4) at the midpart of the tooth width followed by a flat chamfered part by using correspondingly formed cam plates or the chamfered edge can be entirely rounded (FIG. 5). Both the roundness R1 of the central ridge between chamfers on the same tooth and also the roundness R2 of the entire chamfer are produced in two operations each in opposite directions of rotation: Upon a rotation of the workpiece in the direction of the arrow 23, the cutting edge 13 follows the path 38 or 40 and, in the opposite direction of rotation 24, the path 39 or 41. The paths 38 and 39 or 40 and 41 intersect each other at the center of the tooth.

Figure 6:
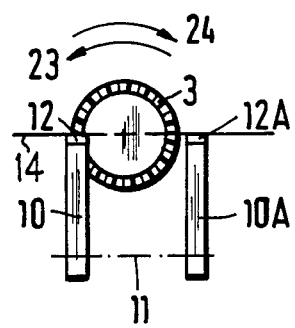
FIGS. 6 to 9 illustrate the association of the tool with the workpiece during various machining variations.

It was mentioned above in connection with FIG. 2, that the chamfered surfaces could be produced with one or with two tools. If two tools are used, namely, one for the one direction of rotation and the other one for the other direction of rotation, then these are arranged as illustrated in FIG. 6. The one tool 12 is with its rocking lever 10 in the operating position, that is the cutting edge thereof is in front of the workpiece 3 and is adapted to work or machine same. The other tool 12A strands with its rocking lever 10A offset laterally from the workpiece 3. The workpiece rotates in the direction of the arrow 23 and the chamfered surfaces 35 are produced. To produce the chamfered surfaces 36, the rocking levers 10, 10A are both moved to the left in FIG. 6, so that now the tool 12 with its rocking lever 10 stands laterally spaced from the workpiece and the tool 12A is in the operating position.

Figure 7:
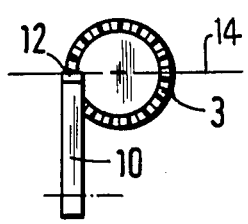
Figure 8:
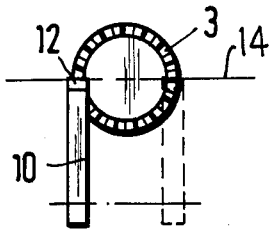

If only one tool is used for both directions of rotation, then same can always remain at the same spot (FIG. 7), that is the operating position is the same for both directions of rotation. In consideration of the cutting edge geometry, however, it is preferable to move, during the change in the direction of rotation, the tool 12 with its rocking lever 10 onto the other side of the workpiece (dashed contour in FIG. 8). It can be seen from the contour of the cutting edge 13, which contour is illustrated in FIG. 2, that the cutting conditions for the two directions of rotation differ. By moving the tool onto the other side of the workpiece, the same cutting conditions are achieved for the two directions of rotation. If the tooth count (number of teeth) z of the workpiece is uneven, then during the moving of the tool, the workpiece must at the same time be rotated through ½ of a tooth pitch.

To move the rocking levers 10, 10A, known devices as for example spindles or hydraulic cylinders are used in the machine tool construction. These devices are not illustrated in the figures.

Figure 11:
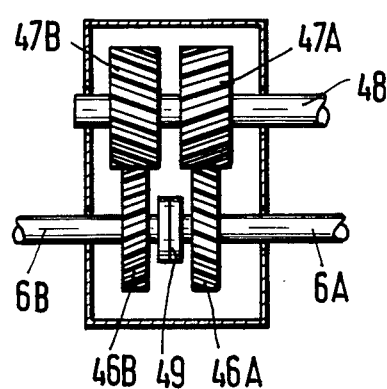
FIG. 11 is a view of a control gearing for the control shaft.

It can also be seen from FIGS. 2 and 3 that, during the change in the direction of rotation, a position shifting between the workpiece 3 and the cutting edge 13 may be necessary. This can be achieved by various means, for example, by a control gearing which acts onto the tool spindle and with which the workpiece can be rotated a small amount relative to the cutting edge. Such a control gearing is illustrated in FIG. 11. The workpiece spindle 6 is for this purpose divided into two shafts 6A and 6B. A helically toothed pinion 46A, 46B is arranged on each of the mutually adjacent ends of the shafts. Their respective tooth angles are oppositely oriented, as it is schematically indicated in FIG. 11, and they have the same tooth count. The two pinions 46A, 46B each mate with a gear 47A, 47B, both of which are also helically toothed and are wider than the pinions 46A, 46B so that they can be moved along their axis without disengaging from the pinions 46A and 46B. The two gears 47A, 47B are fixedly secured to a longitudinally movable shaft 48. The shaft 48 and with it the helically toothed gears 47A, 47B can be moved via an electric servomotor or hydraulically. Since the two tooth angles of the gear pairs are oppositely directed, the two pinions 46A, 46B are thereby rotated in opposite directions to one another in response to an axial movement of the shaft 48. Depending on this additional movement, the workpiece can be rotated in one or in the other direction. A shiftable clutch 49 can be provided between the helically toothed pinions 46A, 46B which clutch 49 is preferably open during the adjusting of the pinions, otherwise, however, remains closed. With this the rigidity of the first workpiece spindle 6 is assured in spite of the control gearing.

Figure 9:
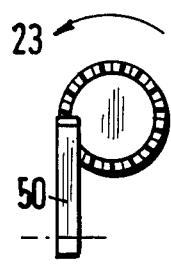
Figure 10:
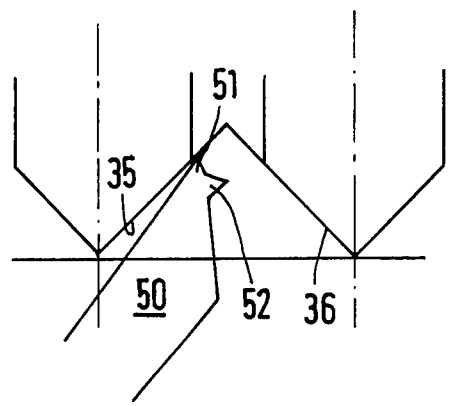
FIG. 10 illustrates a tool having two cutting edges.

The chamfered surfaces 35, 36 can be worked or machined using a special tool 50 (FIGS. 9 and 10) also at a constant or single direction of rotation 23. The tool 50 is for this purpose equipped with two cutting edges, of which one cutting edge 51 produces the chamfered surface 35 and the other cutting edge 52 produces the chamfered surface 36. A moving or shifting of the position of the tool is not necessary.

FIG. 12 illustrates in a simplified manner an arrangement of the rocking lever 10 on its axle 11 and the operative relation with the cam plate 20. Two eccentric rings 54, 55 which can be both rotated relative to one another and can be fixed together, permit an elevational adjustability of the cutting edge 13. The cam plate 20 acts against the force of a spring 56 acting onto the rocking lever. The cam plate 20 is in the illustrated example, and in contrast to FIG. 1, arranged on the side of the workpiece so as to prevent with assurance a pulling of the cutting edge into the workpiece 3.

The rocking lever 10 can, as this is illustrated in FIG. 13, also be force-guided between two cam plates 20, 20A. Just like the other figures, FIGS. 12 and 13 are to be viewed only as schematic in nature to show the principle. The cam plate can also have a conical surface 57. As a result, and through an axial adjustment, for example out of the drawing plane of FIG. 12, the movement of the rocking lever 10 or rather the stroke of the cutting edge 13 could then be changed thereby.

The chamfered shapes, which can be produced by the above-described method or with the corresponding devices can, due to the arrangement of the cutting edge 13 with respect to the workpiece 3 or due to the relative movements of the parts to one another, have a pair of V-shaped surfaces (FIG. 10) or a single V-shaped surface 35, 36 (FIG. 2), which are parts of a multiple-thread screw. Deviations from the geometrically exact screw surface, which would be caused by the movement of the tool on an arc, are substantially compensated for by a suitable shape of the cam plate.

Figure 16:
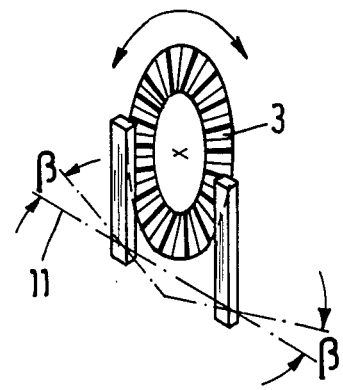
FIG. 16 illustrates a further variation of FIGS. 6 to 9.

The aforedescribed devices can also be used for deburring or for chamfering of the front tooth edges of toothed workpieces, whereby only a comparably small chip removal occurs, which corresponds approximately with the surface 21A in FIG. 3. If also the base of the tooth is to be deburred or chamfered then a tilting of the axis 11 of the rocking lever 10 at an angle $\beta$, as is indicated in FIG. 16, is preferable. The cutting edge 13 can then be rendered effective in the area which is not reached during a normal stroke movement.

Figure 15:
FIG. 15 illustrates a speed curve of the workpiece.

FIG. 14 illustrates, again schematically, an arrangement having separate drives 60, 61 for workpiece spindle 6 and the cam plate 20, respectively. Only the important parts are illustrated. Parts, which correspond with comparable parts of FIG. 1, are indicated by the same reference numbers. The two drive motors 60, 61 are connected through a so-called electrical shaft or a control mechanism 562, which assures a synchronous running of the workpiece spindle 6 and the control shaft 16 in response to the tooth count z of the workpiece 3. The control mechanism 62 can be adjusted so that the speed of rotation n of the workpiece 3 is changed during one tool stroke, for example is accelerated or decelerated, as this is indicated in FIG. 15. In this manner, corrections in the shape of the chamfer can be carried out, that is concave or convex chamfer halves can be produced or a deviation of the chamfer halves from the geometric helical shape can be counteracted.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for chamfering the axially facing ends of toothed cylindrical or conical workpieces by pushing an effective tool into cutting engagement with said workpiece, which method includes the steps of moving said tool back and forth in response to the peripheral speed of the said workpiece which continuously rotates about its axis of rotation, engaging said tool with said workpiece during said back and forth movement for removing material from said workpiece during each stroke of said tool which is directed onto said axially facing ends of successive teeth of said workpiece, the improvement wherein said step of moving said tool back and forth includes the step of orienting a cutting edge on said tool on a circular segment, the axis of which extends parallel to a radial of said workpiece, which radial starts out from said axis of said workpiece and extends through a tooth on which machining is being performed.

2. The method according to claim 1, wherein two tools are provided for machining left and right chamfer halves on an axially facing tooth end, wherein said orienting step includes an orienting of said tools so that said left and right chamfer halves are machined in separate operations and with separate tools during opposite directions of rotation of said workpiece, whereby the respective inactive tool is disengaged from said workpiece tooth system.

3. The method according to claim 1, wherein left and right chamfer halves on an axially facing tooth end are machined in separate operations with said tool during opposite directions of rotation of said workpiece, wherein said orienting step includes, between said separate operations, an adjustment of the position of said tool relative to said workpiece.

4. The method according to claim 1, wherein left and right chamfer halves on an axially facing tooth end are machined in separate operations with said tool during opposite directions of rotation of said workpiece, wherein said orienting step includes, during the change in the direction of rotation, a movement of said tool to a position in front of the respectively diametrically oppositely lying tooth of said workpiece and said workpiece, having an uneven tooth count, is rotated ½ of a pitch.

5. The method according to claim 1, wherein said tool has a second cutting edge, and wherein left and right chamfer halves on an axially facing tooth end are machined alternately in one operation in the same direction of rotation with said tool, said tool machining alternately with a first cutting edge one chamfer surface and with a second cutting edge the other chamfer surface.

6. The method according to claim 1, wherein left and right chamfer surfaces on an axially facing tooth end are each produced during one workpiece rotation.

7. The method according to claim 3, wherein each chamfer surface half is machined in several steps, namely, all left chamfer halves are machined followed by all right chamfer halves being machined, including the step of changing the direction of rotation of said workpiece and an adjustment of the position of said tool relative to said workpiece.

8. The method according to claim 1, wherein said orienting step includes an orienting of said axis parallel to the horizontal so that said cutting edge will work on teeth on said workpiece that lie on a horizontal radial.

9. The method according to claim 1, including an accelerating and decelerating of said workpiece during each stroke of said tool.

10. The method according to claim 1, including a driving of said workpiece at a uniform speed.

11. The method according to claim 1, including the step of controlling said cutting edge so that it moves toward said workpiece to engage and remove workpiece material and moves away from said workpiece during the time that it is located in a gap between two mutually adjacent teeth on said workpiece.

12. A contoured chamfered surface meshing engagement aid on toothed workpieces manufactured according to the method of claim 1, wherein each chamfered surface one-half is a section from a z-threaded screw, whereby z is the tooth count of said workpiece.

13. A contoured chamfered surface meshing engagement aid on toothed workpieces manufactured according to the method of claim 1, wherein a rounded ridge is provided between a pair of chamfer surfaces and is produced at the same time that the chamfer surfaces are produced.

14. An apparatus for sloping and at least one of chamfering and deburring of the axially facing ends of toothed cylindrical or conical workpieces, comprising:
a machine frame means;
a support means on said frame means for supporting said workpiece for rotation and drive means for continuously rotatingly driving said workpiece;
a rocking lever and pivot axis means for pivotally supporting said rocking lever on said frame means;
a control shaft on said machine frame means and which is supported for rotation;
a tool having a gear cutting edge mounted on a free end of said rocking lever, at least one cam plate means mounted on said control shaft, said cam plate means engaging said rocking lever to cause it to carry out swinging movements about said pivot axis means therefor and which are directed toward a tooth on said workpiece which is to be machined, said cutting edge being oriented at the end of said rocking lever remote from said pivot axis means, said pivot axis means extending parallel to a radial of said workpiece, which radial starts out from said axis of said workpiece and extends through the tooth of said workpiece which is to be machined;
said rotary drive means for said workpiece and said rotary drive of said control shaft being adjusted to one another in such a manner that said gear cutting edge on said tool during one workpiece rotation carries out z strokes toward said workpiece and again back away from said workpiece and thereby machines per stroke one tooth half, whereby z is the tooth count of the workpiece.

15. The apparatus according to claim 14, wherein a second rocking lever and associated cam plate is provided having a tool thereon and wherein means are provided, in response to the direction of rotation of said workpiece, for one of said two rocking levers to be moved by the associated cam plate, while the other one is stopped out of engagement with said toothed workpiece.

16. The apparatus according to claim 14, including a control gearing for driving said cam plate, the position of said rocking lever and said tool being controlled by rotating said cam plate relative to said workpiece.

17. The apparatus according to claim 14, wherein said rocking lever, in front of said axially facing side of said workpiece, has means for effecting a movement thereof from one side to the other.

18. The apparatus according to claim 14, wherein said rocking lever is supported on said pivot axis means by means of an adjustable eccentric.

19. The apparatus according to claim 14, wherein resilient means are provided for resiliently urging said rocking lever against said cam plate being arranged on the side of said rocking lever facing said workpiece.

20. The apparatus according to claim 14, wherein said rocking lever is guided between two synchronously rotating cam plates.

21. The apparatus according to claim 14, wherein said cam plate has a conical edge surface and is supported for longitudinal movement.

22. The apparatus according to claim 14, wherein said pivot axis means for said rocking lever is angularly adjustable with respect to said radial of said workpiece in a plane which is parallel to a plane defined by said axis of said workpiece and the same radial.

23. The apparatus according to claim 14, wherein said tool has first and second cutting edges, said second cutting edge being offset with respect to said first cutting edge, whereby one of said first and second cutting edges machines a left chamfer surface and the other cutting edge machines a right chamfer surface.

24. The apparatus according to claim 14, wherein said drive means includes a common motor for driving said workpiece and said cam plate, whereby between at least one of said motor and said workpiece and said motor and said cam plate there is provided at least one gear transmission means having an adjustable transmission ratio.

25. The apparatus according to claim 14, wherein a separate motor is provided for driving said workpiece and said cam plate, said motors being synchronized by a control mechanism.

26. The apparatus according to claim 25, wherein said cam plate carries out a uniform rotary movement and means is provided for controlling the rotary movement of said workpiece so that it is accelerated and decelerated during each stroke of the tool.

* * * * *